United States Patent [19]
Ramacher et al.

[11] Patent Number: 5,253,330
[45] Date of Patent: Oct. 12, 1993

[54] NETWORK ARCHITECTURE FOR THE PROGRAMMABLE EMULATION OF ARTIFICIAL NEURAL NETWORKS HAVING DIGITAL OPERATION

[75] Inventors: Ulrich Ramacher, Munich; Juergen Pandel, Feldkirchen-Westerham; Karl Knauer, Grafing, all of Fed. Rep. of Germany

[73] Assignee: Siemens Aktiengesellschaft, Munich, Fed. Rep. of Germany

[21] Appl. No.: 374,742

[22] Filed: Jul. 3, 1989

[30] Foreign Application Priority Data

Jul. 5, 1988 [DE] Fed. Rep. of Germany ....... 3822758

[51] Int. Cl.$^5$ ............................................. G06F 15/18
[52] U.S. Cl. .................................................... 395/27
[58] Field of Search ....................... 364/513, 200, 900; 235/152; 307/201; 395/27

[56] References Cited

U.S. PATENT DOCUMENTS

| | | | |
|---|---|---|---|
| 4,044,243 | 8/1977 | Cooper et al. ...................... | 235/152 |
| 4,944,982 | 2/1991 | Duranton et al. .................. | 364/513 |
| 4,974,169 | 11/1990 | Engel ................................. | 364/513 |

FOREIGN PATENT DOCUMENTS

1189755 7/1989 Japan .

OTHER PUBLICATIONS

Lippmann, R. "An Introduction To Computing with Neural Nets", *IEEE Assp Magazine*, Apr. 1987, pp. 4-22.
Frazier, "Ariel: A Scalable Multiprocessor For The Simulation of Neural Networks", pp. 107-114.
Suzuki et al; "A Study of Regular Architectures For Digital Implementation of Neural Networks", ISCAS '89 pp. 82-85.
Treleaven, "VLSI Architectures for Neural Networks", *IEEE Micro*, Dec. 1989, pp. 8-27.
Duranton et al, "Learning on VLSI:A General Purpose Digital Neurochip", *Phillips Journal of Research*, vol. 45, No. 1 1990, pp. 1-17.
Theeten et al., "The Lneuro-Chip: A Digital VLSI With On-Chip Learning Mechanism", *Innc 90 Int'l Neural Network Conf.* 1990, pp. 593-596.
Goser et al., "VLSI Technologies for Artificial Neural Networks", *IEEE Micro* Dec. 1989, pp. 28-44.
Yasunaga et al., "A Wafer Scale Integration Neural Network Utilizing Completely Digital Circuits", *Proc. IJCNN Int'l Joint Conf. on Neural Network* 1989 V.Z pp. 213-217.
Ramacher et al., "Systolic Synthesis of Neural Networks", *INNC 90 Int'l Neural Network Conference*, pp. 572-576.
"Wege Zur Grobintegration—Diskrete Und Redundant Wafer Scale Integration", pp. 81-91. ITG-Fachberichte 98, Mar. 16-18, 1987.
Proceedings on the 1981 European Conference on Circuit Theory and Design "Hardware Implementation of Wave Digital Filters Using Programmable Digital Signal Processors", Aug. 1981, pp. 1052-1057.
Proceedings on the Workshop of Designing for Yield, "A Cost-Oriented Redundancy Model for Defect-Tolerant VLSE//WSI Systems", Jul. 1987, pp. 1-14.
Wafer Scale Integration, "A Self Testing WSI Matrix--Matrix Multiplier", 1988, pp. 51-61.

*Primary Examiner*—Allen R. MacDonald
*Attorney, Agent, or Firm*—Hill, Van Santen, Steadman & Simpson

[57] ABSTRACT

A network architecture for the programmable emulation of large artificial neural networks ANN having digital operation employs a plurality L of neuron units of identical structure, each equipped with m neurons, the inputs (E) thereof being connected to network inputs ($E_N$) multiplied or branching via individual input registers ($REG_E$). The outputs (A) of the neuron units are connectable to network outputs ($A_N$) at different points in time via individual multiplexers (MUX) and individual output registers ($REG_A$) and the neuron units have individual auxiliary inputs via which signals can be supplied to them that represent weighting values (W) for weighting the appertaining neural connections and represent thresholds (0) for weighting input signals.

2 Claims, 12 Drawing Sheets

NETWORK ARCHITECTURE FOR THE PROGRAMMABLE EMULATION OF ARTIFICIAL NEURAL NETWORKS HAVING DIGITAL OPERATION

BACKGROUND OF THE INVENTION

The present invention is directed to a network architecture for the programmable emulation of large artificial neural networks (ANN) having digital operation.

Artificial neural networks (referred to below as ANN) are proposed for the parallel processing of extremely large data sets with the goal of pattern recognition and processing (for example, of voice or images). Such an ANN is composed of a plurality of non-linear processor elements (neurons) that are networked with one another via variable "weighting factors".

The following non-linear transfer characteristics have been proposed for modeling the neurons, c.f. R. P. Lippmann, "An Introduction to Computing with Neural Nets", IEEE ASSP Magazine, April 1987, pages 4–22:
binary distinction,
linear ramp function with saturation characteristic,
sigmoidal function,
tangent-hyperbola function.

Further, a plurality of different structures for the networking of the neurons exist (for example "Hopfield net", "Hamming net", "Perceptron", c.f. R. P. Lippmann as well). A direct digital realization of large nets of this type seems impossible with the current technologies for manufacturing integrated circuits because of the plurality of neurons (>1000) that are required. The main problem is that the number of connections and, thus, the number of variable weighting factors quadratically increases with the number of neurons. For example, 1,000,000 weights are required given 1000 neurons in a completely meshed network.

A few realizations of ANN having, for example, 54 or 256 neurons are disclosed in the literature for a programmable or, respectively, non-programmable network, c.f. H. P. Graf, P. De Vegvar, "A CMOS Associative Memory Chip based on Neural Networks, Proc. 1987 IEEE Int. Conf. on Solid State Circuits, pages 304, 305, 437; H. P. Graf et al, "VLSI implementation of a neural network memory with several hundreds of neurons", AIP Conference Proceedings 151, "Neural Networks for Computing", pages 182 through 187, Snowbird, Utah, 1986; W. Hubbard et al, "Electronic Neural Networks", AIP Conference Proceedings 151, "Neural Networks for Computing", pages 227 through 234, Snowbird, Utah, 1986. Proposed realizations have also been disclosed, see J. P. Sage, K. Thompson, R. S. Withers, "An Artificial Neural Network Integrated Circuit based on MNOS/CCD principles", AIP Conference Proceedings 151, "Neural Networks for Computing", pages 381 through 384, Snowbird, Utah, 1986. These all involve analog realizations of analog ANNs. Compared to digital realizations, they have the advantage of a significantly smaller implementation surface area. What is disadvantageous, however, is the high power consumption caused by the required resistance matrix, this power consumption opposing a realization of larger, programmable networks (with more than a few hundred neurons). The behavior and the properties of the modelings of ANNs hitherto proposed are preeminently investigated by simulation on vector computers, work stations or special processor fields. The fundamental disadvantage of this method is that the (space) parallelism inherent in the neural network is completely or partially lost in the processing of the information and, thus, the calculating time of the simulated network increases to such orders of magnitude, particularly for large neuron composites, that a speedy or quasi-realtime processing of the jobs cited above is impeded or becomes impossible.

A significant shortening of the calculating time and a far greater pattern throughput is obtained, by contrast, with hardware emulators. In contrast to hardware simulators, they contain an artificial neural network having a small size with whose assistance a larger network can be emulated.

In addition to a higher throughput, the advantage of a digital realization of an ANN is comprised in the greater freedom with which the user can select and set networktypical parameters (for example, discriminator functions).

Since, on the one hand, the algorithm of a neural network having no specific architecture can be executed faster, and networks with only a few hundred neurons do not present a meaningful application because of their low memory capacity, the following points must be particularly taken into consideration in the design of digital emulators for artificial neural networks (referred to below as neuroemulators): A neuroemulator should be able to synthesize neural networks of an arbitrary type and of a size adequate for the applications (modularity);

allow or itself undertake the external programming of the weightings and thresholds;

contain the known discriminator functions;

allow the branching or non-branching of inputs or, respectively, outputs;

enable the feedback of the outputs onto the (branched or non-branched) inputs;

comprise the simplest interfaces to the accompanying development environment; and be employable as a module for larger emulators.

Emulator Architectures for the Recognition Phase

1. Basic Digital Module for artificial neural networks
1.1 Neural algorithms

Artificial neural networks are distinguished by a simple algorithm structure in what is referred to as the recognition phase:

$$y_i = f\left(\left|\sum_{j=1}^{N} W_{ij}a_j + w_ib_i + \Theta_i\right| \cdot \lambda\right), i = 1 \ldots M \tag{1}$$

N describes the number of inputs $a_j$ shared by all neurons (these inputs are referred to below as branching inputs; connections that are not present are represented by weightings set at zero), M describes the number of neurons of the network, the matrix W describes the weightings for the branching inputs, $W_i$ describes the weighting of the nonbranching, individual input of the $i_{th}$ neuron and $O_i$ describes the switching threshold thereof. Finally, f describes the discriminator function (i.e., the type of characteristic of the neuron) and $y_i$ describes the output of the $i_{th}$ neuron. The discriminator function can be steepened or flattened with the parameter $\lambda$ and a Boltzmann distribution can also be promoted. Further, this parameter can be exploited for norming purposes. Also potentially added to the algorithmic specification of a neural network is that a feedback network is involved; the outputs $y_i$ are connected to the inputs $a_j$ or, respectively, $b_i$. Equation (1) has been kept more general than necessary for a specific model of an artificial neural network; in exchange, it opens up the handling of all known models, (c.f. "Workshop on ARTIFICIAL NEURAL SYSTEMS", presented by "State of the art", Munich 1987), when the expression $$\prod_{k=1}^{j} a_k$$

is inserted into (1) instead of $a_j$.

2. Necessity for Emulation of Neural Networks

The algorithmic parallelism contained in (1) can be utilized in terms of hardware without limitation when small neural networks are involved. Programmable networks having 54 neurons and non-programmable networks having 256 neurons can presently be realized in analog fashion, cf. H. P. Graf et al, "VLSI Implementation of a Neural Network Memory with Several hundreds of neurons", AIP Conf. Proceedings 151, "Neural networks for computing", pages 182 through 187, Snowbird, Utah, 1986 and H. P. Graf, P. De Vegvar, "A CMOS associative memory chip based on neural networks", Proc. 1987 IEEE Int. Conf. on Solid State Circuits, pages 304, 305, 437. By contrast, the digital realization only allows about a dozen neurons to be accommodated on a chip. It can be anticipated that hardly more than a few hundred neurons can be digitally realized in a chip with future submicron technology or with very large area integration, cf. U. Ramacher, "Wege Zur Grossintegration-diskrete und redundante Wafer Scale Integration", ITG Fachberichte, Vol. 98, "Grossintegration", pages 81 through 91, Baden-Baden, 1987, and U. Ramacher, "A cost oriented redundancy model for defect-tolerant VLSI/WSI systems", Proc. of the Workshop on Designing for Yield", Oxford, July 1987. It will be difficult for the analog realization to achieve the lower threshold of about 1000 neurons critical for the application of programmable neural networks given the present proposed architectures, being difficult because of the power consumption that quadratically increases with the number of neurons (at present, 250 mW for 54 neurons, cf. H. P. Graf et al, "VLSI implementation of a neural network memory with several hundreds of neurons", AIP Conf. Proceedings 151, "Neural Networks For Computing", pages 182 through 187, Snowbird, Utah, 1986 and H. P. Graf, P. de Vegar, "A CMOS associative memory chip based on neural networks", Proc. 1987 IEEE Int. Conf. on Solid-State Circuits, pages 304, 305, 437.)

What both possible realizations also share is the bus and/or pin problem. When, for example, a fedback Hopfield network of 256 neurons realized in analog fashion is considered, then a bandwidth of about 3 MHz would derive per input, cf. H. P. Graf et al, "VLSI implementation of a neural network memory with several hundreds of neurons", AIP Conf. Proceedings 151, "Neural Networks for Computing", pages 182 through 187, Snowbird, Utah, 1986 and H. P. Graf, P. de Vegvar, "A CMOS associative memory chip based on neural networks", Proc. 1987 IEEE Int. Conf. on Solid-State Circuits, pages 304, 305, 437. Since the required number of pins is only available with expensive special housings, special interface modules would have to be developed in order to be able to take advantage at all of the speed advantage of the massive parallelism.

SUMMARY OF THE INVENTION

The object of the present invention is to create a network architecture of the species initially cited for constructing large digital neural networks that allows small neuron units that can be realized with technology possibilities presently available to be employed.

For achieving this object, a network architecture according to the preamble of patent claim 1 is proposed that is characterized by the feature recited in the characterizing part thereof.

Advantageous developments of the invention are characterized by the features recited in the subclaims.

A small neural network having m neurons and $m^2$ multipliers for the weighting throughout is provided in accord with the network. The architecture selected allows a fast emulation of arbitrary network structures with all of the previously recited, non-linear transfer characteristics of the artificial neurons.

The hardware architecture of the invention enables large neural networks to be constructed with smaller neural networks for which a hardware realization is still possible. For example, a plurality of these small networks can be combined to larger networks or the algorithm (1) of a large network is rastered or scanned, with the algorithm of a small network. The latter denotes the emulation of a large network with a smaller network.

The decomposition of a network of M (for example, 1000) neurons into smaller units of m (for example, m=4) neurons (m is a divisor of N; N/m=:K) can be achieved by rewriting (1):

$$y_i = f\left(\left|\sum_{n=0}^{K-1} \sum_{j=nm+1}^{(n+1)m} W_{ij}a_j + w_i b_i + \Theta_i\right| \cdot \lambda\right), \quad (2)$$

$$i = 1 \ldots M$$

BRIEF DESCRIPTION OF THE DRAWINGS

Various exemplary embodiments of the invention shall be set forth below with reference to several figures.

The Functioning of the 4-Neuron Unit

Figure 1:
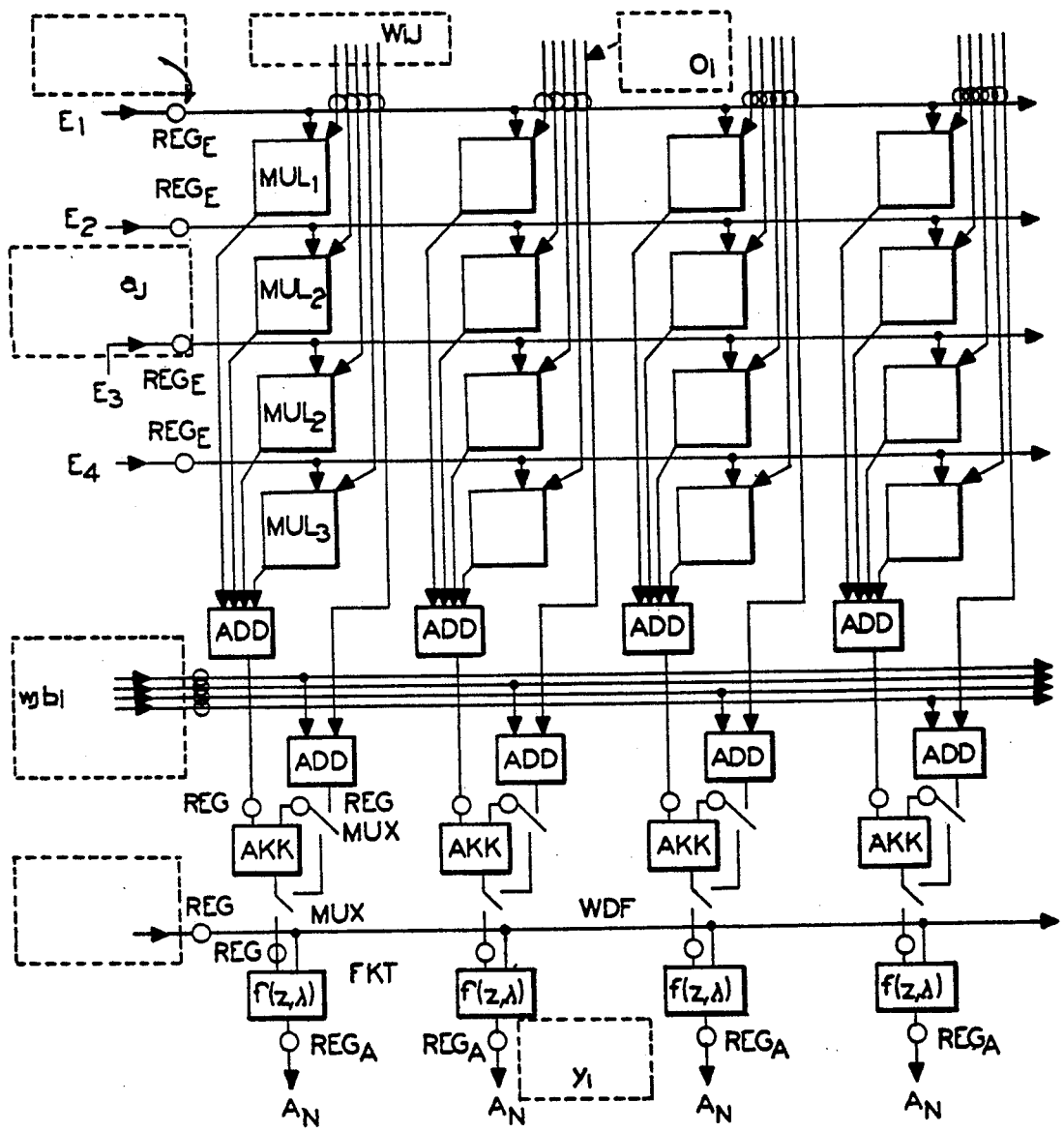
FIG. 1 shows the architecture of a 4-neuron unit of the invention.
Figure 2:
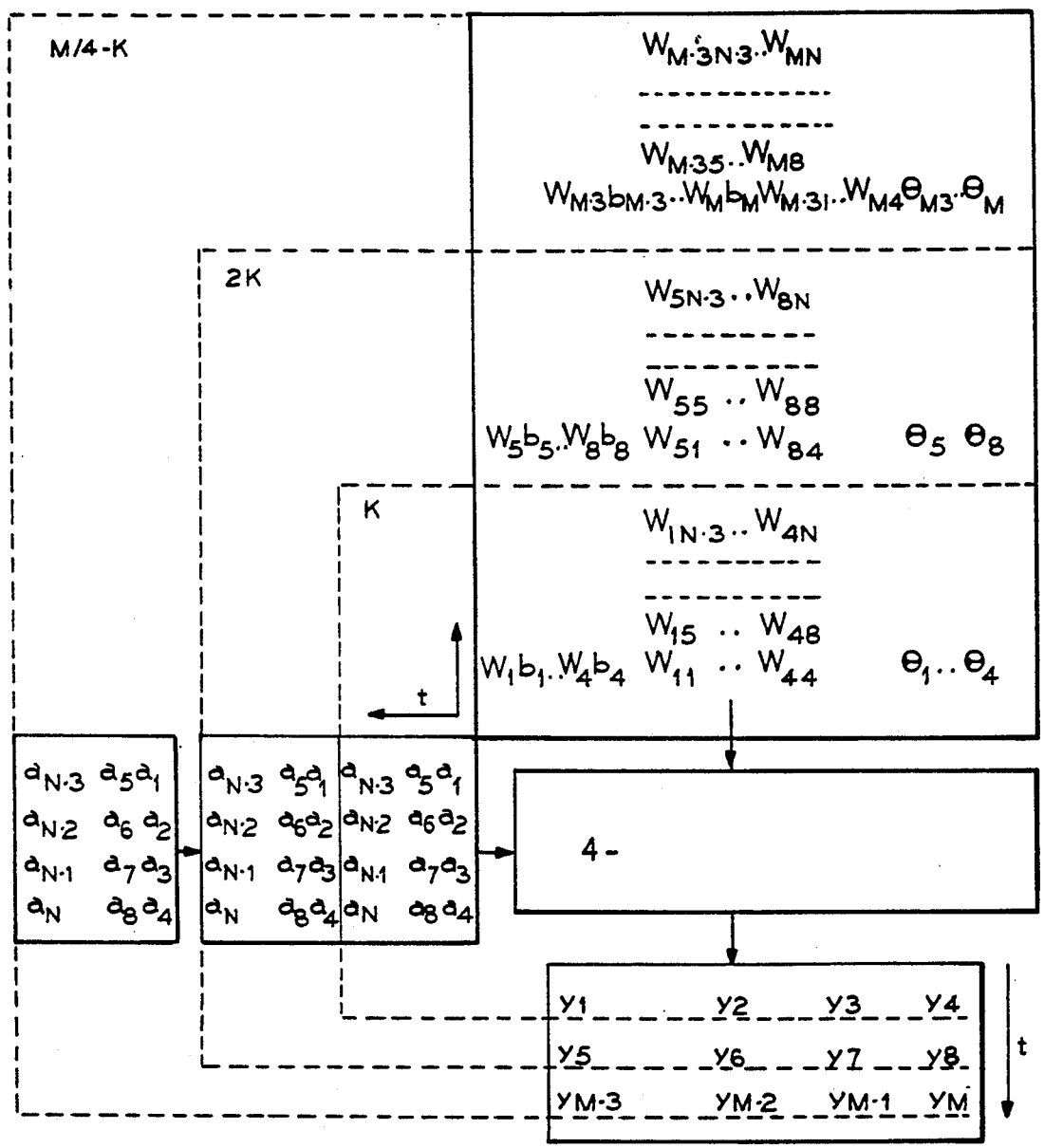
FIG. 2 shows a schematic illustration of the data flow in a 4-neuron unit.

With reference to the example of a network comprising N inputs and M outputs, FIG. 1 and FIG. 2 show the structure and functioning of a neuron unit having m=4 neurons with which a processing of the expression (2) can be digitally realized.

FIG. 1 shows the architecture of the 4-neuron unit. One neuron herein is composed of four multipliers, two adders, one accumulator, two multiplexers and one discriminator (binary, "linear ramp", sigmoidal and tanh characteristics can be selected). A multiplier is also provided that, among other things, can steepen the characteristic of the sigmoidal function and can thus also promote a Boltzmann distribution. At the beginning of a calculation of (2), n=0, j=1, the expressions "$w_i b_i + \Theta_i$", i=1 through 4 are formed parallel to the weighting of the branching inputs and the accumulator AKK is preset to this value in the following clock on the basis of the multiplexer following the adder ADD. In the following K−1 clocks (K=N/m), the two multiplexers close the accumulation path and the double sum of (2) is calculated. Finally, the accumulator is read out in the (K+1)$^{th}$ clock (the argument of f is calculated for λ=1) and is supplied to the discriminator. The first four of M output vectors thus appear at the four outputs after K clocks (registers are not taken into consideration) and the next four output vectors appear after a further K clocks, etc. This operation is to be executed M/m times overall.

FIG. 2 shows in what chronological rhythm input vectors, weightings and thresholds must be supplied to the 4-neuron unit and in what chronological rhythm the output vectors appear. This is valid for an arbitrarily structured network without feedback. In the case of a fedback network, the output vectors are first deposited in a local memory. This is then read out onto the branching or, respectively, non-branching inputs (dependent on the neuron model) and the sequence set forth above is repeated with the same weightings, thresholds, etc. (let it be noted that any lines realized in analog fashion cannot emulate fedback, larger networks in anyway other than by iteration.)

Figure 3:
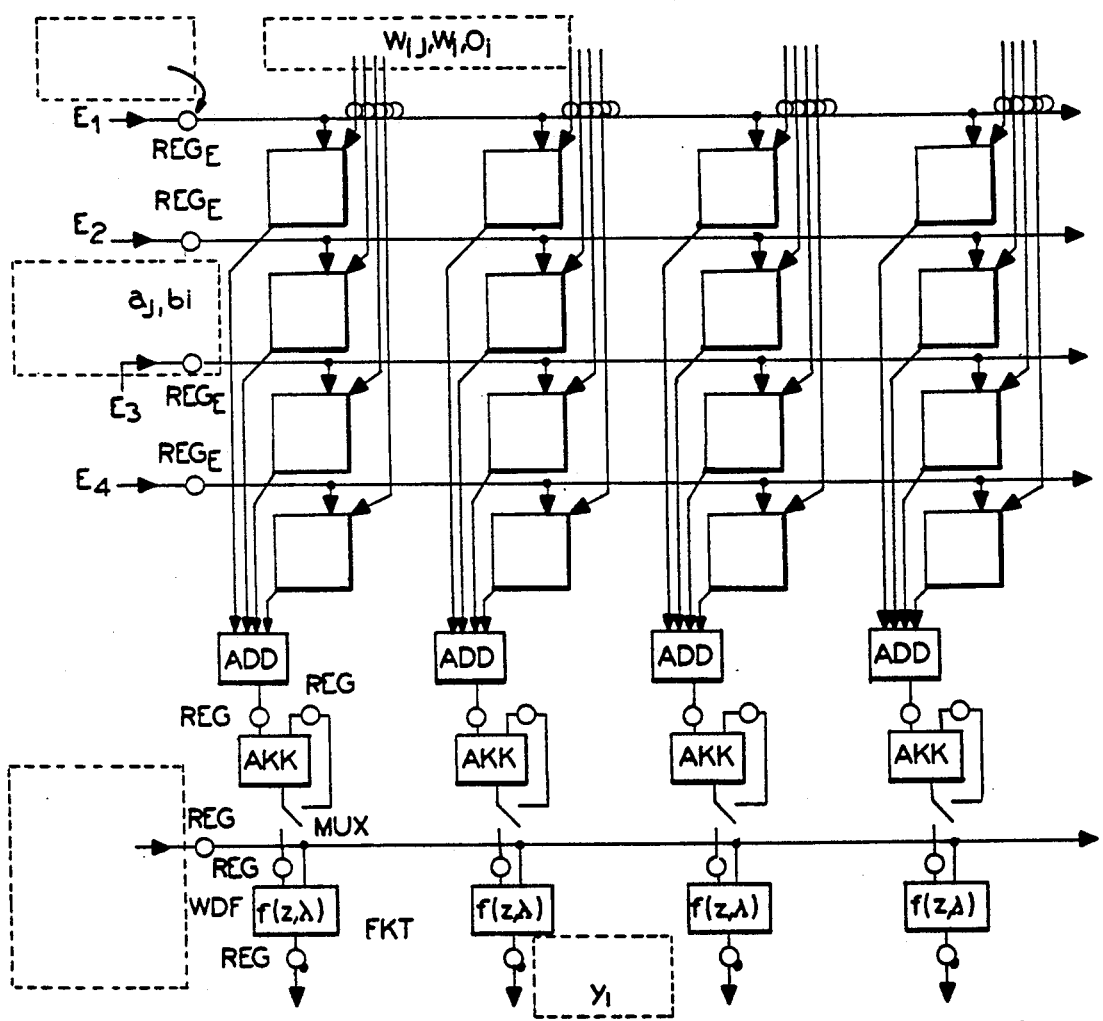
FIG. 3 shows a further 4-neuron unit of the invention having a reduced plurality of inputs in comparison to the 4-neuron unit of FIG. 1.

The lines for thresholds and non-branching inputs can be eliminated when additional clocks are expended. When, for example, $b_1$, $b_2$, $b_3$, $b_4$ are applied to the branching inputs and ($w_1 000$), ($0w_2 00$), ($00w_3 0$), ($000w_4$) are applied to the weighting inputs and when $b_i$ or, respectively, $w_i$ is replaced in the next clock by one or, respectively, $\Theta_i$, then $w_i b_i + \Theta_i$ is calculated. As set forth, this is followed by the weighting of the branching inputs. Overall, the calculating time is increased by 2 N/m clocks. 64 pads and 4 adders can be eliminated in this way, cf. FIG. 3.

Throughput and Calculating Time of a 4-Neuron Unit

A plurality of (N/m)·(M/n) clocks is required in order to calculate all M output vectors for a (feedforward) network with a m-neuron unit. It can seen that the calculating time (corresponds to the throughput given employment of a single M-neuron unit) is inversely proportional to the square of the neurons situated in the unit. However, it must be taken into consideration that the number of 8-bit inputs for weightings, thresholds, input vectors and output vectors increases proportionally to $4m + m^2$.

On the basis of multipliers designed in 1.5 μm technology, it can be estimated that a clock time of <50 ns can be achieved for a 4-neuron unit. $10^6$ or, respectively $10^8$ connections can thus be classified with the 4-neuron unit in 3 ms or, respectively, 0.3 s. For fedback networks, the afore-mentioned times must also be multiplied by the number of iterations.

EXAMPLES FOR THE APPLICATION OF THE M-NEURON UNIT

First Example

Figure 4A:
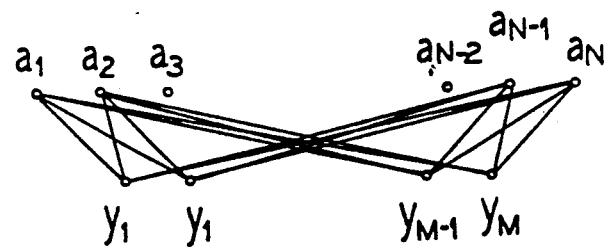
FIG. 4a shows a first example of the employment of m-neuron unit in what is referred to as an instar network.

Instar (N>M):
The matrix of the weightings has the priority M×N, the calculating time amounts to N·M/m$^2$ 50 ns, cf. FIG. 4a.

Second Example

Figure 4B:
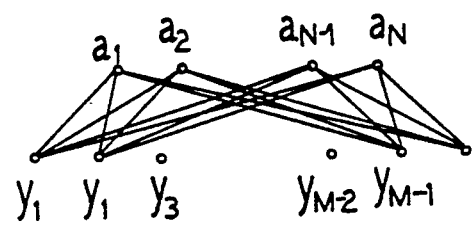
FIG. 4b shows a second example of the employment of a m-neuron unit in what is referred to as an outstar network.

Outstar (N<M):
The matrix of the weightings has the priority M×N, the calculating time amounts to N·M/m$^2$ 50 ns, cf. FIG. 4b.

Third Example

Figure 4C:
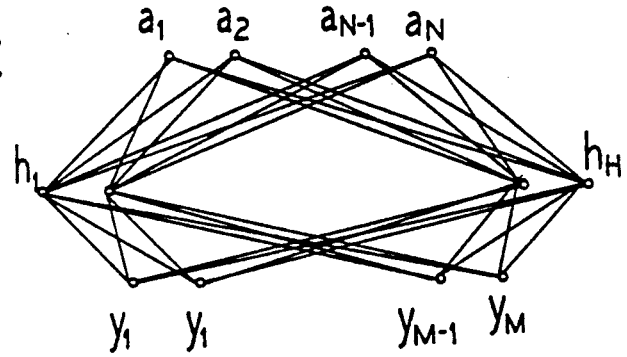
FIG. 4c shows a third example of the employment of a m-neuron unit of a m-neuron unit- in what is referred to as a feedforward-multi-layer perceptron.

Feedfoward-Multilayer Perceptron
N inputs, H hidden neurons and M outputs are provided, cf. FIG. 4c. Given realization with a single M-neuron unit, an expression $$h_i = f\left( \left| \sum_{n=0}^{K-1} \sum_{j=nm+1}^{(n+1)m} W_{ij} a_j + w_i b_i + \Theta_i \right| \cdot \lambda \right), \quad (3)$$

$$i = 1 \ldots H, K = N/m$$

is first processed, the output vectors $h_i$ are then applied to the branching inputs and an expression $$y_i = g\left( \left| \sum_{n=0}^{K-1} \sum_{j=nm+1}^{(n+1)m} G_{ij} h_j + Y_i \right| \cdot \sigma \right), \quad (4)$$

-continued $$i = 1 \ldots M, K = H/m$$

is executed. The calculating time amounts to (N H/m² + H M/m²) 50 ns.

Fourth Example

"Ordered feedback" Multilayer-Perceptron

The $0^{th}$ iteration level or stage is described by the sequential processing of the expressions (3), $b_i = \Theta$ and (4). For the first iteration, the quantities $b_i$ are replaced by $y_i$ (neurons not participating in the feedback receive the weighting $w = 0$) and the output vectors $y^{(1)}_i$ of the first iteration are calculated. For the second iteration, the quantities $y_i$ are replaced by the quantities $y^{(1)}_i$ and the output vectors $y^{(2)}_i$ of the second iteration are calculated, etc. The complete iteration or, respectively, feedback is described by the recursive system:

$$h_i^{(t)} = f\left( \left| \sum_{n=0}^{K-1} \sum_{j=nm+1}^{(n+1)m} W_{ij} a_j + w_i y_i^{(t)} + \Theta_i \right| \cdot \lambda \right), \quad (5)$$

$$i = 1 \ldots H, K = N/m$$

$$y_i^{(t+1)} = g\left( \left| \sum_{n=0}^{K-1} \sum_{j=nm+1}^{(n+1)m} G_{ij} h_j^{(t)} + Y_i \right| \cdot \sigma \right), \quad (6)$$

$$i = 1 \ldots M, K = H/m$$

$1 \leq t \leq T$ is thereby the iteration index.

Fifth Example

Fedback Hopfield Network

Figure 4D:
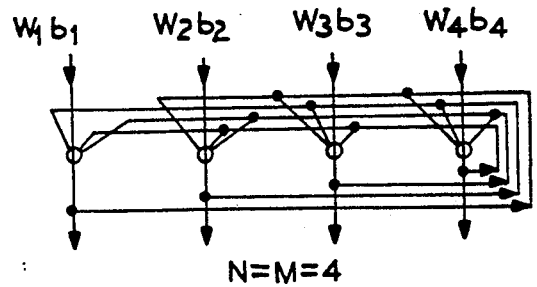
FIG. 4d shows a further example of the employment of a m-neuron unit in what is referred to as a Hopfield network.

FIG. 4d shows an example of such a fedback Hopfield network wherein $N = M = 4$.

No weighting is undertaken during the $0^{th}$ iteration. An expression $$y_i^{(1)} = f(|w_i b_i + \Theta_i| \cdot \lambda), i = 1 \ldots M \quad (7)$$

is calculated. In the first iteration and all following iterations, the weighting of the branched inputs is then taken into consideration and a complete expression $$y_i^{(t+1)} = f\left( \left| \sum_{n=0}^{K-1} \sum_{j=nm+1}^{(n+1)m} W_{ij} y_j^{(t)} + w_i b_i + \Theta_i \right| \cdot \lambda \right), \quad (8)$$

$$i = 1 \ldots M, K = N/m$$

is calculated for an arbitrarily high $1 \leq t \leq T$.

Interfaces and Memory Periphery of the 4-Neuron Emulator

Figure 5:
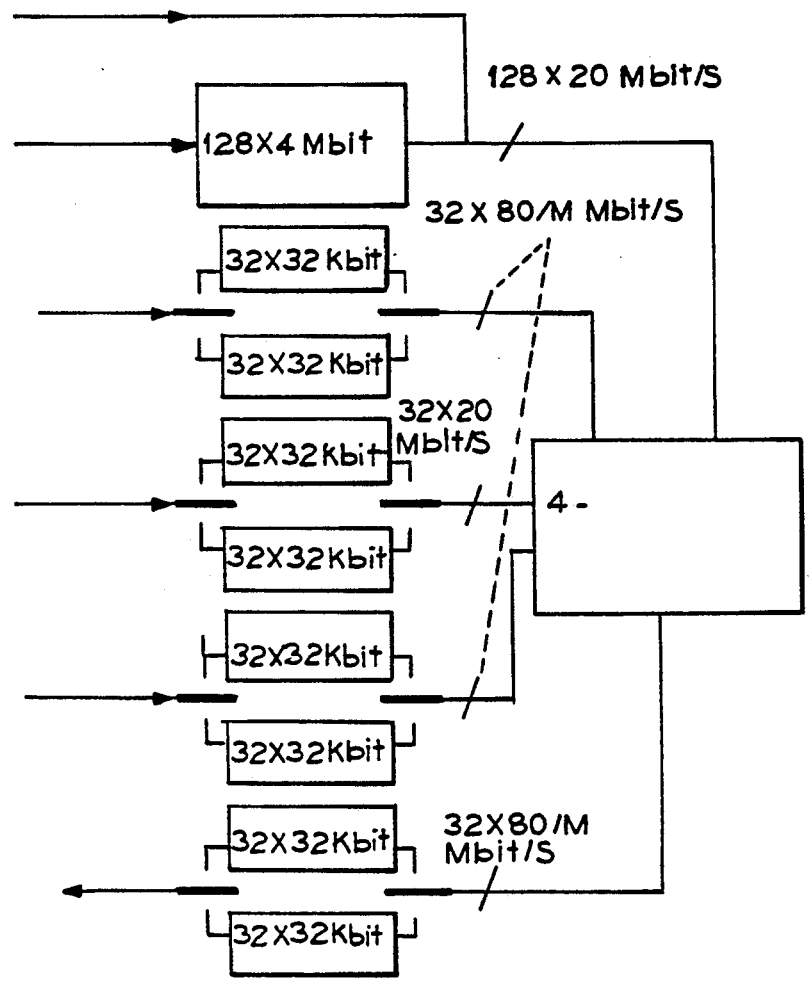
FIG. 5 shows a schematic illustration of the interferences and of the memory periphery of a 4-neuron unit of the invention.

In order to enable the above-described application of the m-Neuron unit, the basic module must be equipped with corresponding interfaces and memories. FIG. 5 shows the local memory periphery of the neuro-emulator "Type 1" constructed with a single 4-Neuron unit. It is designed for a network having a maximum of 100,000 inputs (limited by the bit width of the accumulator) and a maximum of 64 million weightings (of 8 bits each). Since the product of the number of 8-bit inputs and the number of 8-bit outputs must remain $\leq 64 \cdot 10^6$, a "fast" interface is also provided via which the weightings can be read in from the outside. What is disadvantageous is that the interface must be 128·20 Mbit/s fast. The local memory, by contrast, allows a serial interface having a smaller bandwidth.

A higher, so-called pipeline degree is fundamentally conceivable for the m-neuron unit and the throughput could be correspondingly increased. However, it must be noted that the transfer of the weightings must ensue either via an extremely broad and fast interface or by reading a local memory out. A data rate of 20 Mbit/s already derives per terminal pin and bit line given a clock time of 50 ns.

Performance Features of the Neuro-Emulator "Type 1"

The following properties can be achieved measured with reference to the catalog of demands previously erected for the performance features of a neuro-emulator: the neuro-emulator "Type 1"
synthesises networks of an arbitrary type having a maximum of 100,000 inputs;
requires the external programming of the weightings and thresholds and can locally store the weightings for 64 million connections;
contains the known discriminator functions;
allows the branching or non-branching of inputs or, respectively, outputs;
enables the feedback of the outputs onto the (branched or non-branched) inputs;
comprises simple interfaces to the accompanying development environment;
weights and discriminates N inputs and M outputs in $3 \cdot N \cdot M$ ns ($4 \leq N, M$).

Figure 6:
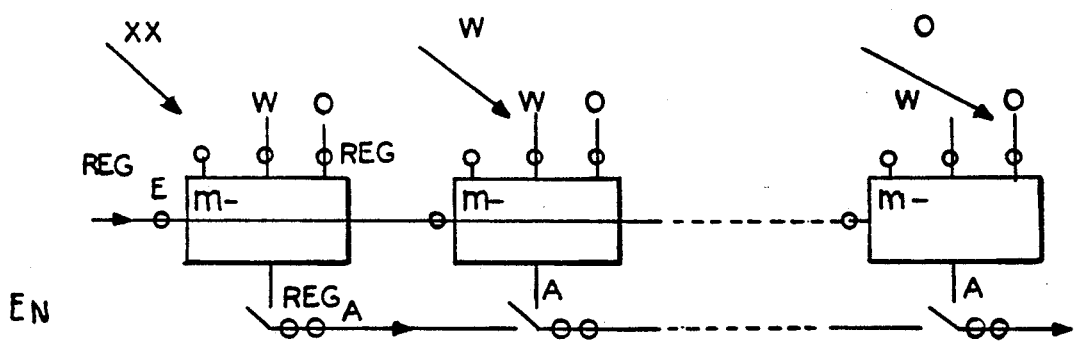
FIG. 6 shows a schematic illustration of what is referred to as a systolic neuro-emulator arrangement comprising L m-neuron units.

Embedding the Basic Module in Linear, Systolic Arrangements Multiple Exploitation of the Input Vectors The basic module that has been described is well-suited for embedding into a linear, systolic arrangement, cf. T. Noll, "Systolishe Zellenfelder", ITG Fachberichte, Vol. 98, "Grossintegration", pages 203 through 207, Baden-Baden, 1987 and U. Ramacher, "A self testing WSI matrix-matrix multiplier", Proc. of the IFIP Workshop on Wafer Scale Integration, Brunel, UK, September 1987. When L m-neuron units are connected successively, cf. FIG. 6, then input vectors al . . . aN no longer have to be repeated M/m times but only M/Lm) times. Large neuro-emulators having m·L neurons can be constructed in this fashion that can in turn very quickly emulate even larger neuro-networks.

Functioning of the Systolic Neuro-Emulator

Figure 7:
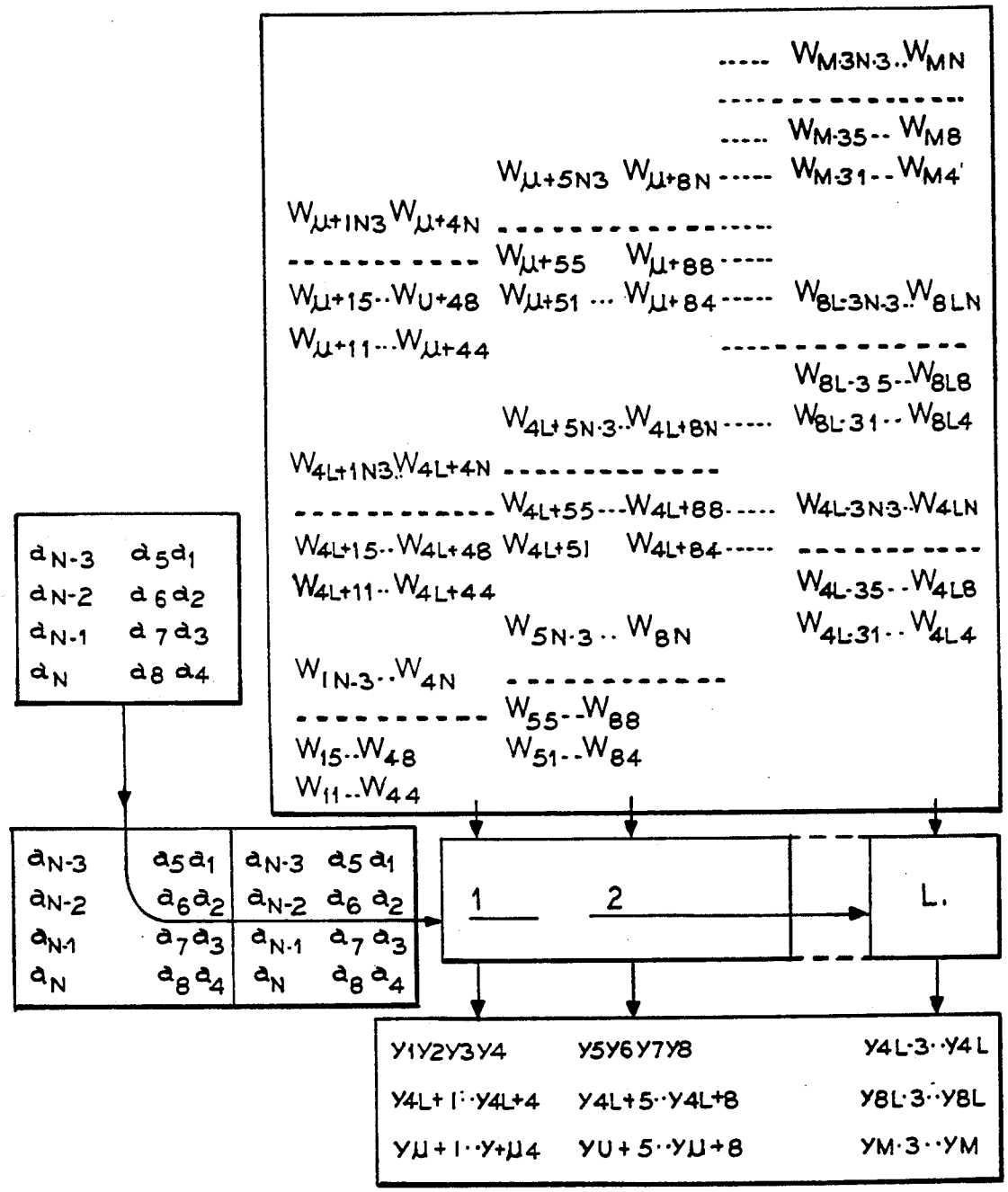
FIG. 7 shows a schematic illustration of the data flow in what is referred to as systolic neuro-emulator.

After $K = N/m$ clocks, the output vectors $y_i \ldots y_m$ are read via the multiplexer into the first output register of the first m/neuron unit. One clock later, the second unit sends its output vector $y_{m+1} \ldots y_{2m}$ via the multiplexer into its first output register. At this point in time, $y_1 \ldots y_m$ are situated in the second output register of the first m-neuron unit. Another clock later, $y_1 \ldots y_m$ or, respectively, $y_{m+1} \ldots y_{2m}$ are situated in the first output register (the multiplexer has switched) or, respectively, in the second output register of the second m-neuron unit. It can be seen that the L-member chain first outputs the output vectors $y_{4L} - 3 \ldots y_{4L}$ and outputs $y_1 \ldots y_4$ last. Since $M \neq 4L$ is generally valid, the input vectors must be sent into the arrangement M/4L times in succession until all output vectors $y_1 \ldots y_m$ are present. FIG. 7 shows the data flow of the systolic neuro-emulator (for reasons of space, the non-branching inputs $w_{i\,bi}$ and the thresholds $\Theta_i$ are not recited and the abbreviation $\mu=(M-1)/4L$ is used).

Throughput and Calculating Time of the Systolic NeuroEmulator

Since $(N/m)+L-1$ clocks are needed until the first $L\cdot M$ output vectors are present, a further $(N/m)\times((MmL)-1)$ clocks must be weighted for until the last output vector $y_m$ is also calculated. Finally, another L clocks are required in order to fetch the last output vector situated in the arrangement at the output. An expression $$\text{calculating time} = \left| \frac{N \cdot M}{m^2} \cdot \frac{1}{L} + 2L - 1 \right| \cdot \Delta, \quad (9)$$

$\Delta$ = clock time derives overall for the calculating time. The throughput is defined by the first summand in (9).

With $\Delta=50$ ns, $L=100$ and $m=4$, thus, $10^6$, $10^8$ or, respectively, $10^{10}$ connections can be weighted and discriminated in about 30 $\mu$s, 3 ms or, respectively, 300 ms.

Interfaces and Memory Periphery of the Neuro-Emulator "Type 2"

Figure 8:
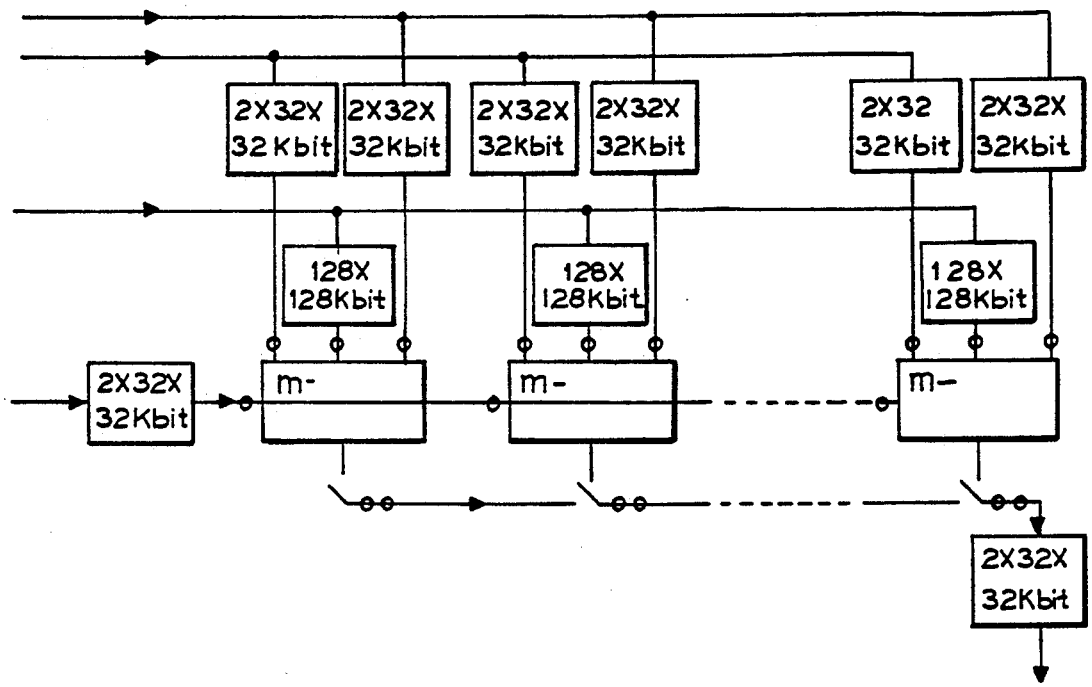
FIG. 8 shows a schematic illustration of the interferences and of the memory periphery of a second type of neuro-emulator (Type 2) of the present invention comprising 250 4-neuron units.

The neuro-emulator "Type 2" is composed of 250 4-neuron units. $N=M/250$ weightings are required per 4-neuron unit. When $128\times128\times$kbit per unit are provided as local memory, then $5\cdot24\times10^8$ connections can be realized. Since the accumulator of the 4-neuron unit guarantees the desired 8-bit precision of the output vectors for a maximum of 100,000 input vectors, the interfaces shown in FIG. 8 and the memory periphery likewise shown at that location derive.

It is to be particularly emphasized that the neuro-emulator "Type 2" manages with the same number of terminal pins for the data lines as the neuro-emulator "Type 1". At the same time, the neuro-emulator "Type 2", however, offers performance features that are significantly improved in comparison to the neuro-emulator "Type 1", see below.

The 32 32-kbit memories are doubly provided in order to be able to simultaneously execute read/write operations. As mentioned, the advantage of the local memory for the weightings lies therein that the 250 weighting memories can be serially loaded. This requires a multiple of calculating time and is not critical since the weightings in the recognition phase do not change over long sequences of input vectors.

Since the weightings $W_{ij}$ change by $\delta(W_{ij})$ after every set of N input vectors in the learning phase of a neuro-network, on the other hand, care must be exercised in the development of the architecture of the basic module for the learning phase to see that these changes $\delta(W_{ij})$ are internally calculated with the weightings $W_{ij}$ and are accumulated over the duration of the learning phase. After the end of the learning phase, the weightings $W'_{ij}$ that have been learned can then be loaded into the weighting memory.

EXAMPLES FOR THE APPLICATION OF THE NEURO-EMULATOR "TYPE 2"

The observations set forth above are valid since the neuro-emulator "Type 2" is composed of 1000 neurons instead of being composed of 4. Over and above this, the bidirectionalism of the branching inputs of the emulator "Type 1" (FIG. 1) and of the emulator "Type 2" can be utilized for an advantageous realization of an iteration that is potentially required with the emulator "Type 2". Since the output vectors of the systolic arrangement appear at the other end of the arrangement as the input vectors, it is advantageous to be able to feed the complete set of the M output vectors in at this arrangement end and to send it through the arrangement in the opposite direction. The data flow onto the branching inputs would thus change in direction after every iteration. This can be achieved with bidirectional drivers and registers.

Performance Features of the Neuro-Emulator "Type 2"

The neuro-emulator "Type 2"
- synthesises networks of an arbitrary type having a maximum of 100,000 inputs;
- requires the external programming of the weightings and thresholds and can locally store the weightings for 524 million connections;
- contains the known discriminator functions;
- allows the branching or non-branching of inputs or, respectively, outputs;
- enables the feedback of the outputs onto the (branching or non-branching) inputs;
- comprises simple interfaces to the accompanying development environment;
- weights and discriminates N inputs and M outputs in $12\cdot N\cdot M$ ps ($4\leq N$, $1000\leq M$).

Multiple Exploitation of the Weightings

Figure 9:
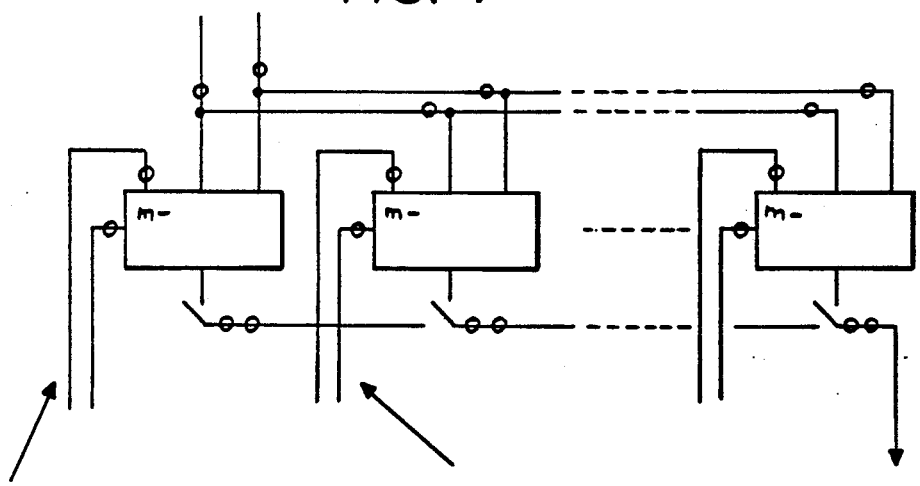
FIG. 9 shows a schematic illustration of what is referred to as a systolic neuro-emulator arrangement comprising P m-neuron units.

The multiple exploitation of the weightings is available with a linear systolic arrangement for the parallel processing of P different sets of input vectors, cf. FIG. 9. This application occurs when the pattern really existing is to be recognized from a plurality of hypothetical patterns, (for example, in the recognition of fluent speech). It may seen from FIG. 9 that the input vectors of a m-neuron unit must be delayed by one clock in comparison to those of the preceding unit. Obviously, the throughput of the arrangement is P times higher than that that can be achieved with a single m-neuron unit (entrusted with the same job). The design of the interfaces and of the memory periphery as well as the evaluation of the performance features of this systolic arrangement, however, can be respectively left up to the person skilled in the art.

Figure 10A:
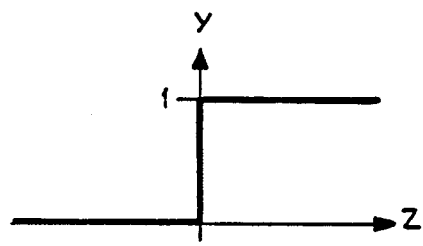
FIGS. 10a, 10b, 10c and 10d show various types of characteristics of a discriminator unit of the present invention.

Circuit Design of the Discriminator Unit Discriminator Functions for Neuro-Networks The job of the discriminator unit is to realize the non-linear transfer function of the neuron. In order to achieve a maximum of flexibility, all transfer characteristics important for neuro networks are contained in this unit. The input signal z of the discriminator (output of the accumulator AKK in FIG. 1) is coded with 32 bits in two's compliment representation, whereby the least significant bit has the place value $2^{-14}$. The following, non-linear discriminator functions are realized in the discriminator unit:

FIG. 10a binary decision unit $\quad y(z) = \begin{cases} 1 & \text{for } z \geq 0 \\ 0 & \text{for } z < 0 \end{cases}$ unit skip function $\quad (10a)$

Figure 10B:
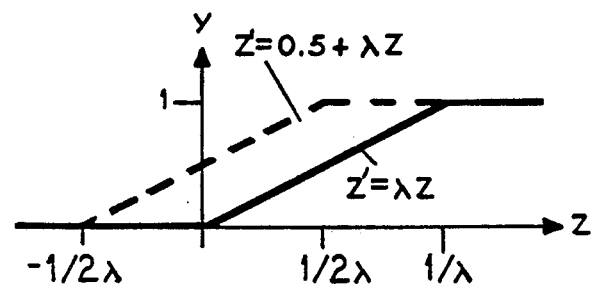

FIG. 10b $$
\text{ramp func- tions } y(z) = \begin{cases} 1 & \text{for } z' > 1 \\ z' & \text{for } 0 \leq z' \leq 1 \\ 0 & \text{for } z' < 0 \end{cases} \text{ with } \begin{array}{l} z' = \lambda z \\ \text{or} \\ z' = 0.5 + \lambda z \end{array} \quad (10b)
$$

Figure 10C:
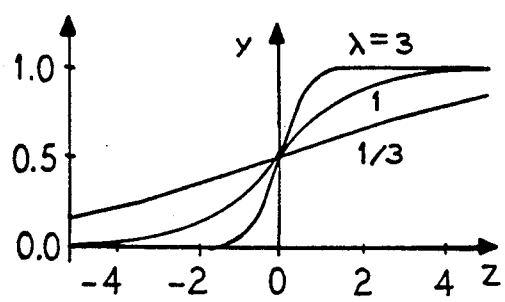

FIG. 10c sigmoidal function $y(z) = [1 + \exp(-\lambda z)]^{-1}$ \hfill (10c)

For these functions, the output signal y is always equal to or greater than 0. The value range (0, 1) can be imaged or mapped onto (−1, 1) with the assistance of the transformation y→2y−1. The sigmoidal function (10c) then becomes

Figure 10D:
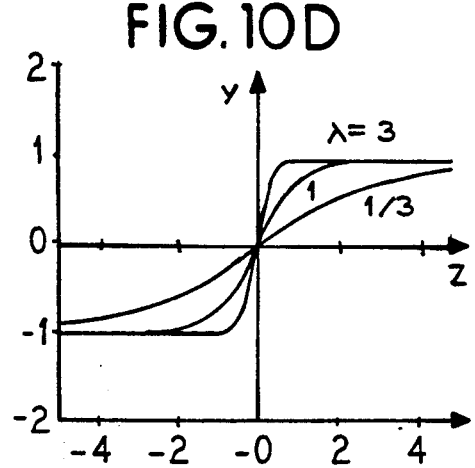

FIG. 10d $y(z) = \tanh(\lambda z)$ \hfill (10d)

The steepness of the ramp function, of the sigmoidal function and of the hyperbola function can be varied by modification of the parameter $\lambda(\lambda>0)$ (cf. FIGS. 10b, c, d). The value range of $\lambda$ is selected such that the curves can proceed both more steeply ($\lambda>1$) as well as more flatly ($\lambda<1$) in comparison to a weighting with 1. The value range of the weighting factors, further, can be varied with the assistance of the parameter. The value of $\lambda$ is coded with 32 bits, whereby the smallest place weight amounts to $2^{-16}$, accordingly valid is $$\lambda = \delta_{31} \cdot 2^{15} + \delta_{30} \cdot 2^{14} + \ldots + \delta_1 \cdot 2^{-15} + \delta_0 \cdot 2^{-16}$$

$$= 2^{15}\{\delta_{31} + \delta_{30} \cdot 2^{-1} + \ldots + \delta_1 \cdot 2^{-30} + \delta_0 \cdot 2^{-31}\},$$

whereby the $\delta_i$ represent the individual place weightings. The numeric range thus extends from 0 through $+32768-2^{-16}$.

Structure of the Discriminator Unit

Figure 11:
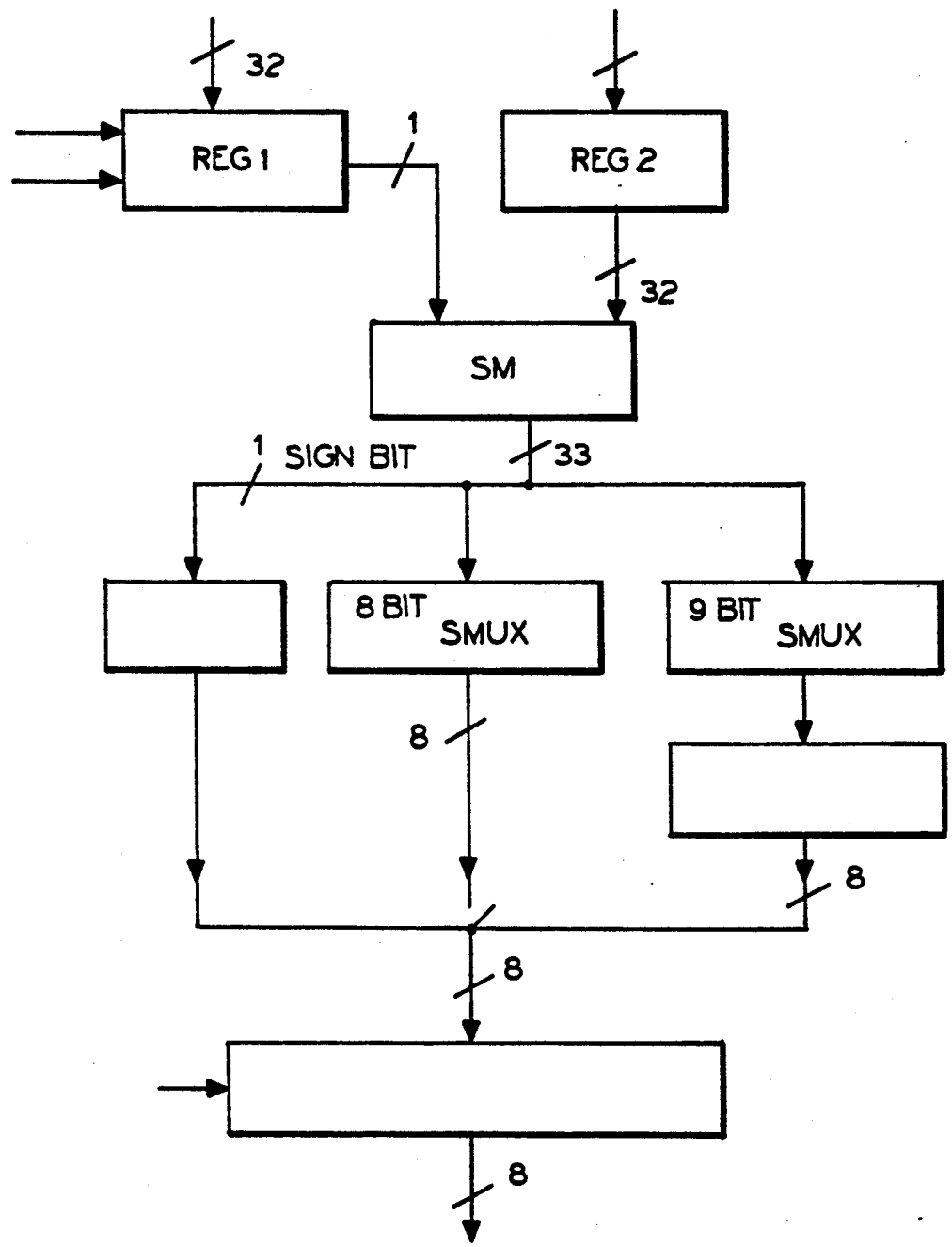
FIG. 11 shows a block circuit diagram from which the structure of a discriminator unit of the invention proceeds.

The block circuit diagram of the discriminator unit is shown in FIG. 11. The constant $\lambda$ and the numerical value of z are stored in registers REG1 and REG2. REG1 is serially read out and the multiplication by z is executed in the following, serial multiplication unit SM. A reduction of the numerical format to the required word width ensues with the assistance of saturation multiplexers SMUX. In the case of the binary decision unit, only the operational sign bit has to be forwarded. The output signal of the saturation multiplexer is forwarded unmodified given the selection of the ramp function, whereas a straight line approximation is carried out in a further unit given the sigmoidal function and the TANH function. In the last block, finally, the linear number transformation for generating negative output numerical values is carried out.

Serial Multiplication Unit

The multiplication of the signal z by the parameter ensues in a serial multiplication unit. The numerical values stored in the register is serially read out beginning with the least significant bit and is supplied to the multiplication unit (cf. FIG. 12).

The multiplication ensues in accord with what is referred to as the Horner pattern (cf. L. Gazsi, "Hardware implementation of wave digital filters using programmable digital signal processors", Proc. 1981, Europ. Conf. on Circuit Theory and Design, pages 1052 through 1057, the Hague, August 1981:

$$\lambda z = 2^{15}\{\delta_{31}z + 2^{-1}(\delta_{30}z + \ldots + 2^{-1}(\delta_2 z + 2^{-1}(\delta_1 z + 2^{-1}\delta_0 z))\ldots)\} \quad (11)$$

Figure 12:
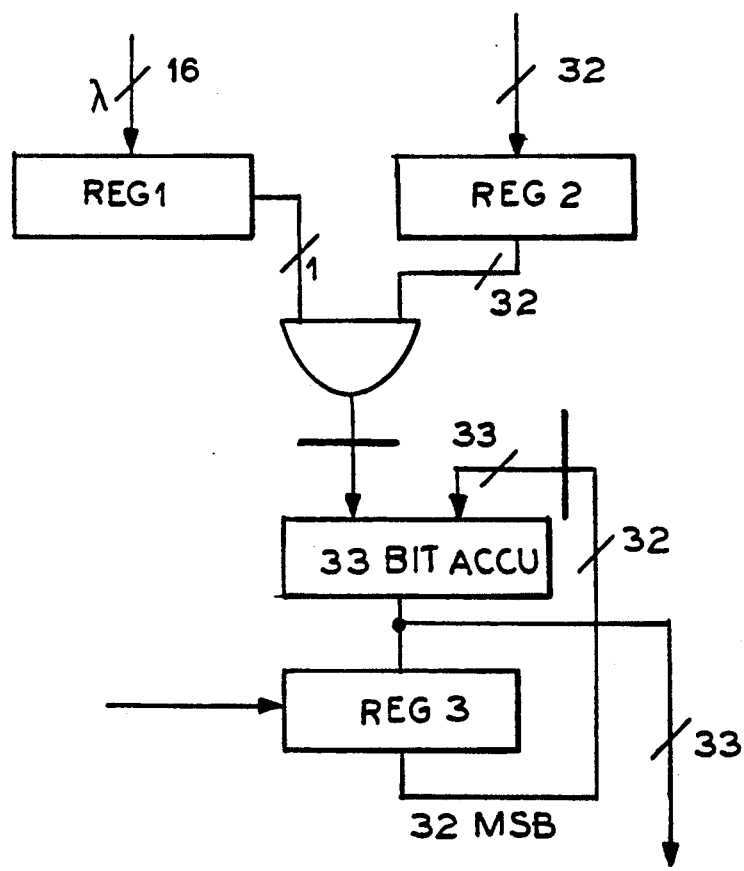
FIG. 12 shows a schematic illustration of a serial multiplication unit.

The multiplication of z by $\delta_i$, i=0 through 31, is realized with an AND element (FIG. 12). Since the additional, low significant bits or "rear bits" arising in the multiplication are not required in the further-processing, the accumulator word length has to be expanded by only one front bit for the calculation of the partial sums. The accumulator register REG3 that is provided must be reset before the calculation of $\lambda z$ (reset signal in FIG. 12). In the first cycle, the first term, $\delta_0 z$, is deposited in the accumulator register REG3. The return of the adder ensues via a hard-wired "right shift" by one position, whereby the operational sign is doubled up (arithmetic shift, multiplication of the partial sum by $2^{-1}$). In the next cycle, the result $(2^{-1}\delta_0 z)$ is added to $\delta_1 z$. This operation is repeated until the bracket in equation (11) is calculated after 32 cycles. The multiplication by $2^{15}$ likewise ensues with a hard-wired shift.

Saturation Multiplexer

The result is now present in a word width of 33 bits; the numerical range that can be represented extends from $-2^{24}$ through $2^{24}-2^{-7}$; the least significant bit has a significance of $2^{-7}$; The output signal of the discriminator, however, should be limited to a word width of 8 bits. In the binary decision unit, the interrogation of the operational sign ultimately suffices; in the ramp function, by contrast, the word width must be limited to 8 bits upon application of a saturation characteristic. Let $z' = \lambda z$ be the input signal of the appertaining saturation multiplexer and let $z_r'$ be the output signal; the saturation characteristic can then be described by $$
z_r' = \begin{cases} 1 - 2^7 & \text{for } z' \geq 1 - 2^7 \quad (0.1111111) \\ 0 & \text{for } z' \leq 0 \quad (0.0000000) \\ z' & \text{otherwise} \end{cases} \quad (12)
$$

The calculation of the sigmoidal function ensues with straight-line sections. Instead of equation (10c), $$y(z')=0.5+0.5 \tanh(z'/2), \quad (13)$$

can be written. Since the second term in (13) is an uneven function in z', it is adequate to approximate this term with straight-line sections for positive values of z'. In the approximation, the error should be smaller than a least significant bit, i.e. smaller than $2^{-7}$. A precision estimate shows that the numerical range of z' can be limited to the interval $(-8, 8)$ and that the significance of the least significant bit dare not be greater than $2^{-5}$. It follows therefrom that at least 9 bits are required for the numerical representation of z'. Accordingly, a second saturation multiplexer is required whose saturation characteristic is established by $$
z_r' = \begin{cases} 8 - 2^{-5} & \text{for } z' \geq 8 - 2^{-5} \\ -8 + 2^{-5} & \text{for } z' \leq -8 + 2^{-5} \\ z' & \text{otherwise} \end{cases} \quad (14)
$$

The quantity $z_s'$ thereby references the output signal of this saturation multiplexer.

Figure 13:
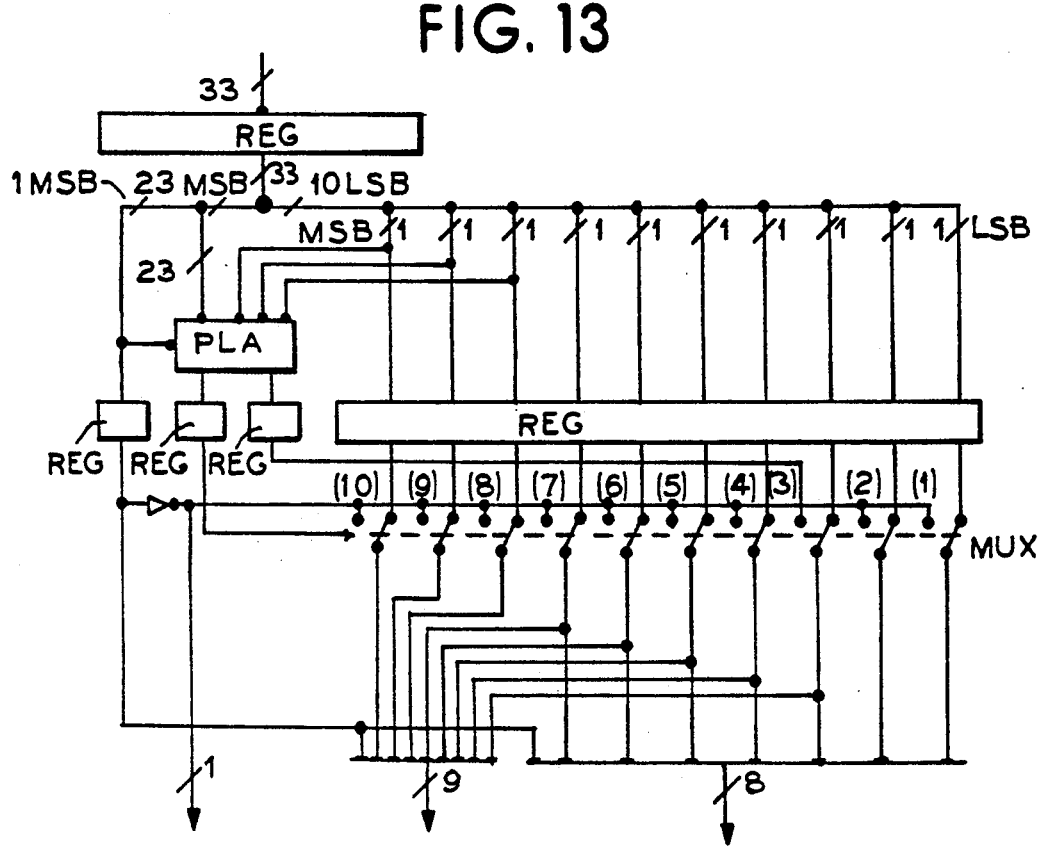
FIG. 13 shows a schematic diagram of what is referred to as a saturation multiplexer.

A common realization of the two functions is shown in FIG. 13. Since the least significant bit of $z'$ has the significance $2^{-7}$, it is precisely the seven low-significant bits that must be selected given application of the ramp function. In case $z' \geq 1 - 2^{-7}$ applies, i.e. in case the operational sign bit is 0 and at least one of the remaining 25 leading bits is 1, all output bits except the operational sign should be set to 1. This ensues with the assistance of multiplexers MUX(1) through MUX(7). Except for MUX(3), the inputs shown at the left are set to 1 in this case by the inverted operational sign bit, whereas the corresponding input of MUX(3) is set to 1 by the PLA (programmable logic array) that is provided. The switching of the multiplexer is likewise controlled by this PLA. The analogous case is valid for $z' < 0$, i.e. in case the operational sign bit is equal to 1 and at least one of the remaining 25 leading bits is 0. In this case, all output bits should be set to 0.

For generating the sigmoidal and the TANH function, the most significant bit and the remaining 22 bits must be investigated in order to identify whether there is a transgression of the value range. The output signals now formed with the assistance of the multiplexers MUX(3) through MUX(10), whereby the least significant bit is always one given saturation (cf. equation (14)), whereas the remaining bits are formed in the same way as before.

Realization of the Sigmoidal Function

As already mentioned previously, the second term in (13), $g(z') = 0.5 \tanh(z'/2)$, should be approximated by straight-line sections for positive values of $z'$, whereby the error should be smaller than $2^{-7}$. A numerical representation of the operational sign amount is required for a calculation given negative values of $z'$. The output value y is then established by $$y = 0.5 + sign(z') \cdot m_1 \cdot |z'| \text{ in the first interval,}$$

$$y = 0.5 + sign(z') \cdot \{m_1 \cdot z_1' + m_2(|z'| - z_1')\} \text{ in the second Interval,}$$

$$y = 0.5 + sign(z') \cdot \{m_1 \cdot z_1' + m_2(z_2' - z_1') + \ldots$$
$$m_{i-1}(Z_{i-1}' - Z_{i-2}') + m_i(|z'| - z_{i-1}')\} \text{ in the ith Interval,}$$

whereby $sign(z')$ is the sign function and the $z_1'$ indicate the appertaining, upper interval limits.

This can be summarized in $$y = 0.5 + sign(z') \cdot |C_i + m_i(|z'| - z_{i-1}')| \text{ for } z_{i-1}' \leq z' \leq z_1', i = 1, \ldots, k \tag{15a}$$

$$C_i = \sum_{j=1}^{i-1} m_j(Z_j - Z_{j-1}), Z_0 = 0 \tag{15b}$$

whereby k is the total plurality of the intervals. For that case wherein all intervals have the same length $\Delta z' = z_1' + 1'$ and, moreover, are equal to a power of two $$\Delta z' = z_i' - z_{i-1}' = 2^L, \tag{16a}$$

$$z_i' = i \cdot 2^L, i = 0, \ldots, k, \tag{16b}$$

$$y = 0.5 + sign(z') \cdot [C_i + m_i(|z'| - (i-1)2^L)], \tag{16c}$$

$$C_i = 2^L \sum_{j=1}^{i-1} m_j \tag{16d}$$

are valid.

In the numerical representation of the operational sign amount of $z'$, the low-significant bits up to and including the position $2^{L-1}$, exactly contains the term $(|z'| - (i-1)2^L)$, whereas the remaining, more-significant bits (without operational sign) identify the segment. A circuit-oriented realization is simplified to a great degree as a result thereof. The numerical values of $z_i$ and $m_i$ can be stored in a ROM that is directly addressed by these more-significant bits. The multiplication of $m_i$ by the term $(|z''| - (k-1)2^L)$ and the addition to $C_i$ can be serially carried out. Dependent on the operational sign of $z'$, the result is added to 0.5 or subtracted therefrom.

In the present case, $k = 8$ segments having a length of $\Delta z' = 1$ suffice in order to guarantee a small error smaller than $2^{-7}$. As a consequence of this slight plurality of terms, it is more advantageous in circuit-oriented terms to employ a PLA instead of a ROM.

Figure 14:
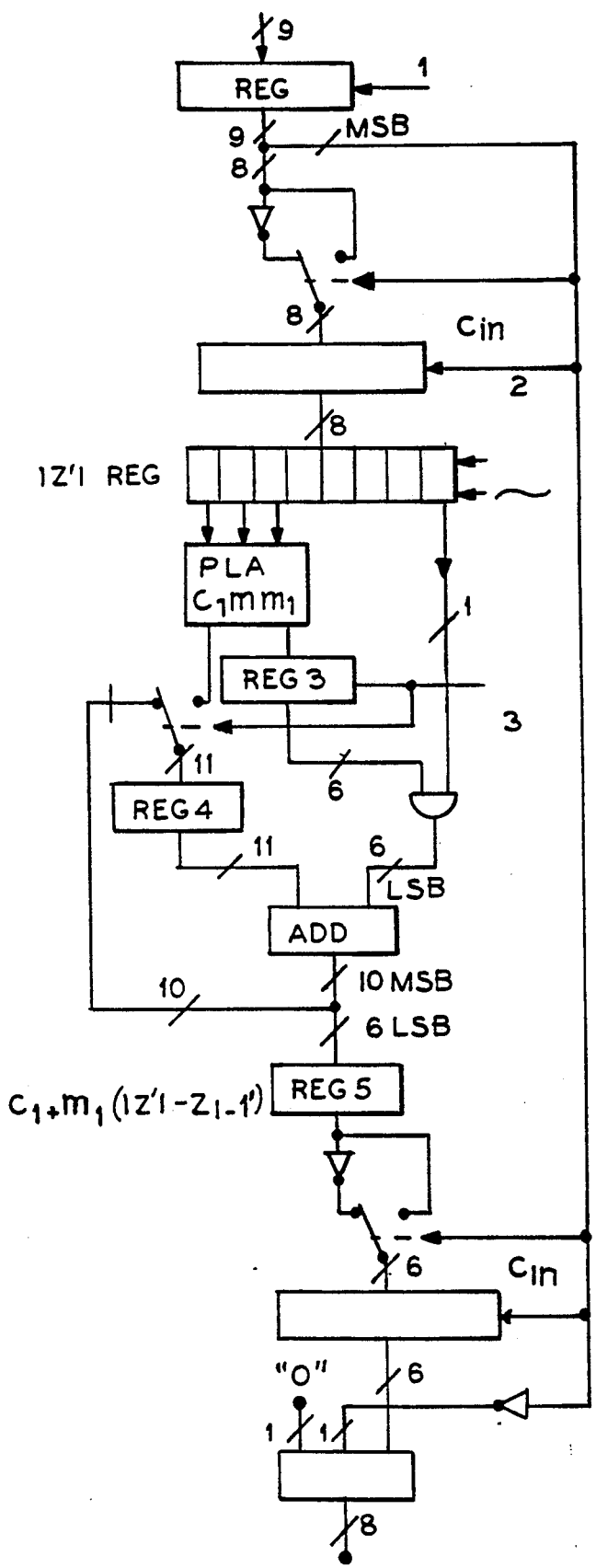
FIG. 14 shows a block circuit diagram of a circuit arrangement for the realization of a sigmoidal function according to FIG. 10.

FIG. 14 shows a circuit-oriented realization. The number $z'$ coded with 9 bits in two's compliment is first converted into a representation of operational sign amount. To this end, the amount of $z'$ is first formed, whereas the operational sign bit remains unaltered. The amount is deposited in the 8-bit-wide register REG2. The three more-significant bits of this register (segment identification) are required for the call-in of $C_i$ and $m_i$; $C_i$ is loaded via the multiplexer MUX2 into an accumulator register REG4, and $m_i$ is loaded into REG3. The less-significant 5 bits of the register REG2 are subsequently read out serially, beginning with the least significant bit. A partial product is calculated in every cycle with the assistance of the AND element and is added to the accumulator content. After every cycle, the result is shifted one place toward the right via a hard-wired "shift" and is deposited in the accumulator register REG4. The result $C_i + m_i(z' - (i-1) 2^l)$ is available in a register REG5 after 5 cycles. In the following stage, this numerical value is added to 0.5 or, respectively, is subtracted therefrom given a negative $z'$.

Generating Discriminator Characteristics with Negative Numerical Values

Only unipolar (non-negative) output signals can be generated with the circuit units set forth up to now. In some instances, however, discriminator characteristics that lie symmetrically relative to the coordinate original are desired. Given the binary decision unit and given the sigmoidal function, the imaging or mapping of the interval (0, 1) onto (−1, 1) by a linear transformation is adequate; given the ramp function, by contrast, care must be exercised to see that $z' = 0.5 + \lambda z$ is calculated in the serial multiplication unit. This can be simply achieved in that the accumulator is not set to 0 with the "reset" signal but is set to the value 0.5.

Since the discriminator output signal is coded with 8 bits in two's compliment representation, the greatest representable number is $1 - 2^{-7}$. There are thereby 128 quantization levels or steps. In order to obtain a symmetrical characteristic, the numerical range from 0 up to this number must be imaged or mapped onto the region of $-1+2^{-7}$ through $1-2^{-7}$, whereby the number of quantization levels remains unaltered. This imaging or mapping occurs by the transformation $$y'=2y-1+2^{-7} \qquad (17)$$

Figure 15:
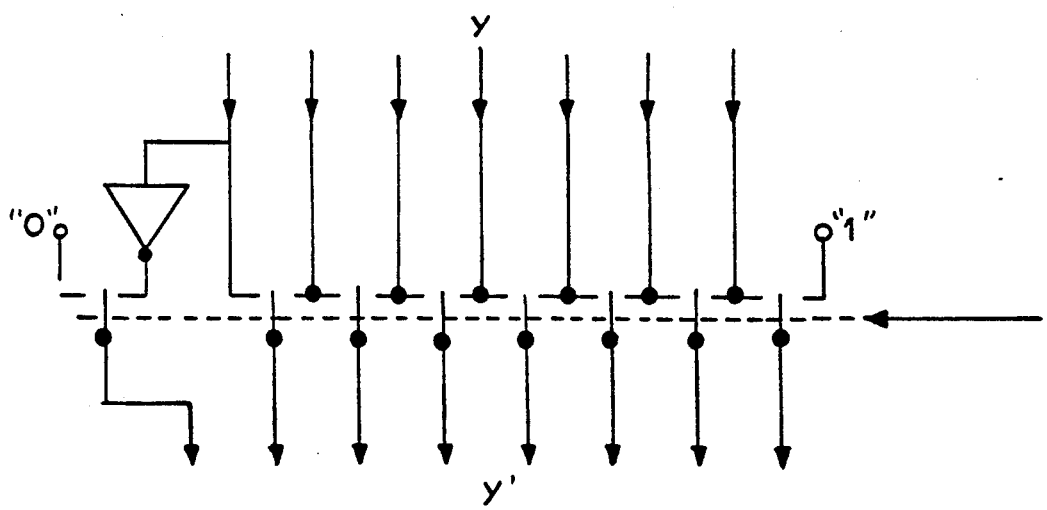
FIG. 15 shows a fundamental circuit diagram of a circuit arrangement for the realization of a linear transformation according to an equation (17) recited below.

The circuit-oriented realization (FIG. 15) is essentially composed of a multiplexer. The multiplication by 2 is very simply executed by a hard-wired left shift and the addition of $2^{-7}$ is executed by a one at the least significant multiplexer input. An inversion of the most significant bit is required only for the addition of $-1$.

It will be understood that variations and modifications may be effected without departing from the spirit and scope of the novel concepts of the present invention.

What is claimed is:

1. A network architecture for programmable emulation of artificial neural networks (ANN) having digital operation, characterized by a plurality L of neuron units of an identical structure, each of said units being equipped with m neurons, said neuron units having neuron inputs (E) which are connected to output lines ($E_N$) branching via individual output registers ($REG_E$), said registers having outputs (A) which are selectively switchable by network outputs ($A_N$) via individual multiplexers (MUX) and individual output registers ($REG_A$), and a plurality of individual auxiliary inputs via which signals can be supplied that represent weighting values (W) for weighting said neuron inputs;

and further characterized in that the m mutually identical neurons each comprise four inputs to each of which a respective digital multiplier (MUL) is allocated, said multipliers having plural inputs, one multiplier input of said plural inputs being connected to the said neuron inputs and another multiplier input thereof being connected to one of the individual auxiliary inputs; each said multiplier having a result output, the result outputs of the multipliers (MUL) are each respectively connected to an individual input of a digital adder (ADD) allocated to the appertaining neuron; the result output of the adder (ADD) is connected via a register (REG) to a first input of a digital accumulator having a result output, the result output of the accumulator (AKK) is connected to a signal input of a function element (FKT) individually allocated to the appertaining neuron, being connected thereto via a multiplier (MUX) individually allocated to the appertaining neuron and via a further register (REG), the signal output of said function element (FKT) being connected via a further register (REG) to the appertaining network output ($A_N$); a second input of the accumulator (AKK) is connected via a further register (REG) to a further output of the multiplexer (MUX); and a selection line for the selection of a discriminator function (WDF) is connected to a selection input of each of the function elements (FKT), being connected thereto via a register (REG);

and further characterized in that the nonmultiplied or non-branching inputs are provided for the neurons, and including four neurons, whereby a first of these inputs is connected to a first adder input of a further adder (ADD) that is allocated to a first neuron, a second of these inputs is connected to a first adder input of a second adder (ADD) that is allocated to a second neuron, a third of these inputs that is allocated to a first adder input of a second adder (ADD) of a third neuron and a fourth of these inputs is allocated to a first adder input of a second adder (ADD) that is allocated to a fourth neuron, and whereby every neuron has an individual auxiliary input allocated to it to which a signal can be supplied that represents a weighting value and that is connected via a register to a second adder input of the second adder (ADD); and a further multiplexer (MUX) is provided for each of the individual accumulators (AKK) to receive the output therefrom, the one output of said further multiplexer being connected to receive the output of the second adder (ADD) and the output of said further multiplexer being connected to the one output of the first multiplexer (MUX) for the formation of an accumulator path.

2. A network architecture for programmable emulation of artificial neural networks (ANN) having digital operation, characterized by a plurality L of neuron units of an identical structure, each of said units being equipped with m neurons, said neuron units having neuron inputs (E) which are connected to output lines ($E_N$) branching via individual output registers ($REG_E$), said registers having output (A) which are selectively switchable to network outputs ($A_N$) via individual multiplexers (MUX) and individual output registers ($REG_A$), and a plurality of individual auxiliary inputs via which signals can be supplied that represent weighting values (W) for weighting said neuron inputs;

and further characterized by a discriminator unit having plural registers (REG1, REG2) in which constants and numerical values are stored; said registers (REG1, REG2) having output connected to a serial multiplication unit (SM), said multiplication unit having outputs connected to a plurality of saturation multiplexers (MUX), whereby the numerical format of the multiplication result can be reduced to a predetermined word width.

* * * * *